United States Patent [19]

Molock et al.

[11] Patent Number: 5,484,863

[45] Date of Patent: Jan. 16, 1996

[54] POLYMERIC OPHTHALMIC LENS PREPARED FROM UNSATURATED POLYOXYETHYLENE MONOMERS

[75] Inventors: Frank F. Molock, Orange Park; Ivan M. Nunez, Jacksonville; James D. Ford, Orange Park, all of Fla.

[73] Assignee: Johnson & Johnson Vision Products, Inc., Jacksonville, Fla.

[21] Appl. No.: 156,135

[22] Filed: Nov. 22, 1993

Related U.S. Application Data

[63] Continuation-in-part of Ser. No. 29,220, Mar. 10, 1993, abandoned.

[51] Int. Cl.$^6$ .................... C08F 226/02; C08F 236/20; G02C 7/04
[52] U.S. Cl. .................. 526/301; 523/106; 525/937; 526/320; 526/323.2; 351/160 H
[58] Field of Search .............. 523/106; 526/301, 526/323.2, 320; 351/160 H; 525/937

[56] References Cited

U.S. PATENT DOCUMENTS

| | | | |
|---|---|---|---|
| 3,988,274 | 10/1976 | Masuhara et al. | 260/29.7 H |
| 4,143,017 | 3/1979 | Tarumi et al. | 523/106 |
| 4,780,488 | 10/1988 | Su et al. | 523/106 |
| 4,889,664 | 12/1989 | Kindt-Larsen et al. | 523/106 |
| 4,904,708 | 2/1990 | Kaetsu et al. | 523/106 |
| 4,921,956 | 5/1990 | Molock et al. | 544/165 |
| 5,034,461 | 7/1991 | Lai et al. | 525/100 |

FOREIGN PATENT DOCUMENTS

| | | | |
|---|---|---|---|
| 321403 | 6/1989 | European Pat. Off. | G02B 1/04 |
| 394496 | 10/1990 | European Pat. Off. | C07H 15/10 |
| 493320 | 7/1992 | European Pat. Off. | C08F 299/02 |

*Primary Examiner*—Paul R. Michl
*Assistant Examiner*—Andrew E. C. Merriam
*Attorney, Agent, or Firm*—W. Scott McNees

[57] ABSTRACT

A soft hydrogel contact lens, is disclosed. The lens is derived from a crosslinked polymer comprising the reaction product of a monomer mixture comprising:

(A) a monounsaturated polyoxyethylene monomer;

(B) a diunsaturated polyoxyethylene monomer of relatively high molecular weight;

(C) a diunsaturated polyoxyethylene monomer of relatively low molecular weight; and (D) a hydrophilic monomer selected from the group consisting of hydroxyethyl methacrylate, methacrylic acid, N,N-dimethylacryiamide, N-vinyl pyrrolidone, glycerol monomethacrylate, itaconic acid, and mixtures thereof.

24 Claims, No Drawings

POLYMERIC OPHTHALMIC LENS PREPARED FROM UNSATURATED POLYOXYETHYLENE MONOMERS

CROSS-REFERENCE TO RELATED APPLICATIONS

This application is a continuation-in-part of our copending application Ser. No. 08/029,220, filed Mar. 10, 1993, now abandoned.

BACKGROUND OF THE INVENTION

This invention relates to crosslinked polymers derived from the polymerization of unsaturated polyoxyethylene monomers and to soft contact lenses prepared from said polymers.

Soft hydrogel contact lenses are currently the lens design of choice for extended wear applications. These lenses are derived from the polymerization of a hydrophilic monomer such as hydroxyethyl methacrylate (HEMA).

A contact lens composed of the polymerization reaction product of HEMA (polyHEMA) is swollen in water to prepare a hydrogel. For conventional higher water-containing hydrogels the water content of the hydrogel lens is an important factor in patient comfort because the permeability of oxygen through the lens is proportional to its water content. Since the cornea of a contact lens wearer needs oxygen for metabolism, the water content of the lens, and hence its oxygen permeability, are important factors in achieving an acceptable degree of wearer comfort and corneal health.

Although polyHEMA lenses can be swollen with water to prepare hydrogels with minimally acceptable water contents and oxygen permeability, lenses composed of polyHEMA alone do not have adequate mechanical properties for routine handling and care. Therefore, commercially available contact lenses contain not only HEMA, but also a crosslinking monomer to enhance the mechanical properties of the finished lens. The crosslinking monomer usually used is ethylene glycol dimethacrylate (EGDMA). While the crosslinking monomer improves the mechanical properties of the finished lens, and therefore enhances the handleability of the lens, it also has adverse consequences. Conventional crosslinking agents reduce the water content of the finished lens and increase its brittleness. The reduced water content lowers the permeability of oxygen through the lens, which in turn decreases patient comfort over an extended period of wear. The increase in brittleness of the lens makes the lens more fragile, and therefore more susceptible to tearing.

Since neither polyHEMA alone nor the reaction product of HEMA with a crosslinking agent has produced optimum properties for a soft contact lens, commercially available lenses typically incorporate additional monomeric components from which the lens is derived. For example, anionic monomers such as methacrylic acid (MAA) are added to increase the water content of the lens, and hydrophobic monomers such as alkyl (meth)acrylates, are added to enhance mechanical properties of the lens. However, there is still room to improve the properties of soft hydrogel contact lenses.

Many disclosures are found in the literature of attempts to fabricate hydrogel contact lenses from unique polymer systems. The following is a representative list of such disclosures:

U.S. Pat. No. 3,988,274
U.S. Pat. No. 5,034,461
U.S. Pat. No. 4,780,487
U.S. Pat. No. 4,780,488
European Patent Application 321,403
U.S. Pat. No. 4,921,956
U.S. Pat. No. 5,196,458
European Patent Application 394,496
European Patent Application 493,320

While numerous attempts have been made to optimize the properties of soft contact lenses, these attempts have fallen short of the goal of fabricating lenses with not only properties suited for patient comfort during extended wear, but also outstanding mechanical properties. What is needed is a polymer that has the requisite properties to achieve the highest degree of patient comfort without appreciably sacrificing its mechanical properties when the polymer is fabricated into a soft hydrogel contact lens.

SUMMARY OF THE INVENTION

The invention provides a crosslinked polymer comprising the reaction product of a monomer mixture comprising:

(A) a monounsaturated polyoxyethylene monomer of the formula:

$$RO(CH_2CH_2O)_n\text{—}CO\text{—}(X)_m\text{—}R^1 \qquad (I)$$
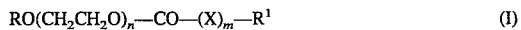

wherein:

R represents an alkyl group having from 1 to 20 carbon atoms;

n represents a number having a value such that the monounsaturated polyoxyethylene monomer has a molecular weight of from about 500 to about 5500;

X represents imido (—NH—);

m is 0 or 1; and when m=1, =$R^1$ represents the residue after removal of the isocyanato group of an organic monoisocyanate that contains a polymerizable olefinic group, and when m=0, =$R^1$ represents the residue after removal of the carboxyl group of an organic monocarboxylic acid that contains a polymerizable olefinic group;

(B) a diunsaturated polyoxyethylene monomer of the formula:

$$R^1\text{—}(X)_m\text{—}CO\text{—}O(CH_2CH_2O)_n\text{—}CO\text{—}(X)_m\text{—}R^1 \qquad (II)$$
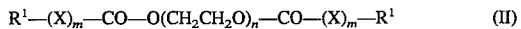

wherein n is a number having a value so that the diunsaturated polyoxyethylene monomer has a molecular weight within the range of from about 2000 to about 11,000, and X, m and $R^1$ are as defined above in connection with the monounsaturated polyoxyethylene monomer;

(C) a diunsaturated polyoxyethylene monomer selected from the group consisting of:

(i) a momomer of Formula (II) wherein n is a number having a value so that the diunsaturated polyoxyethylene monomer has a molecular weight within the range of from about to about 1700, and X, m and $R^1$ are as defined above in connection with the monounsaturated polyoxyethylene monomer;

(ii) a monomer of the formula:

$$R^1\text{—}(X)_m\text{—}CO(OCH_2CH_2)_pO\text{—}\phantom{xxx} \qquad (III)$$
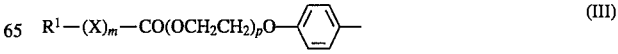

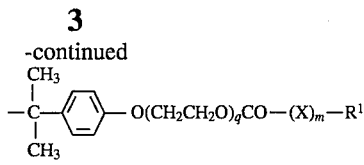

wherein R¹, m and X are as defined above, and p+q are selected so that the monomer represented by Formula (III) has a molecular weight within the range of from about 500 to 1900; and (iii) mixtures of monomers of Formulas (II) and (III), having the molecular weights defined in this paragraph (C); and (D) a hydrophilic monomer selected from the group consisting of hydroxyethyl methacrylate, methacrylic acid, N,N-dimethylacrylamide, N-vinyl pyrrolidone, glycerol monomethacrylate, itaconic acid, and mixtures thereof.

The invention also provides soft contact lenses comprising such polymers.

DETAILED DESCRIPTION OF THE INVENTION

The monounsaturated polyoxyethylene monomer can be derived from the reaction product of a free radical reactive monocarboxylic acid (or its equivalent, such as an acid chloride or an acid anhydride) or a monoisocyanate with a monoalkoxy polyoxyethylene composition such as a $C_{1-20}$alkyl ether of polyoxyethylene glycol ("PEG"). $C_{1-20}$alkyl ethers of polyoxyethylene glycol are commercially available materials that are typically prepared by reacting ethylene oxide with a $C_{1-20}$alkanol. The free radical reactive monoisocyanate can be any monoisocyanate with a polymerizable ethylenic functionality. Examples of such isocyanates include isocyanatoethyl methacrylate (IEM), styrene isocyanate, and the reaction product of HEMA with either isophorone diisocyanate (IPDI) or toluene diisocyanate (TDI).

The monounsaturated polyoxyethylene monomers employed in the invention are represented by Formula (I):

$$RO(CH_2CH_2O)_n—CO—(X)_m—R^1 \qquad (I)$$

wherein:

R represents an alkyl group having from 1 to 20 carbon atoms, preferably from 1 to 6 carbon atoms, and is preferably methyl;

n represents a number having a value such that the monounsaturated polyoxyethylene monomer has a molecular weight of from about 500 to about 5500;

X represents imido (—NH—);

m is 0 or 1; and when m=1, R¹ represents the residue after removal of the isocyanato group of an organic monoisocyanate that contains a polymerizable olefinic group; and when m=0, R¹ represents the residue after removal of the carboxyl group of an organic monocarboxylic acid that contains a polymerizable olefinic group. For example, when m=1, R¹ can be a group selected from monovalent groups of the formula:

—CH₂CH₂OCO—C(CH₃)=CH₂(derived from isocyanatoethyl methacrylate);

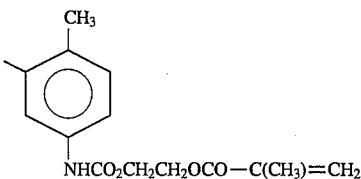

derived from the 1:1 (molar) reaction product of 2,4-tolylene diisocyanate and hydroxyethyl methacrylate];

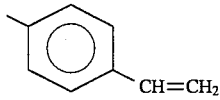

(derived from styryl isocyanate);

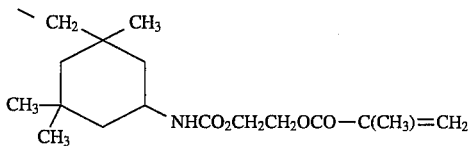

derived from the 1:1 (molar) reaction product of isophorone diisocyanate and hydroxyethyl methacrylate]; and —C(CH₃)=CH₂ (derived from methacryloyl isocyanate). When m in Formula (I)=0, R¹ can be a group selected from monovalent groups of the formula:

—C(CH₃)=CH₂ (derived from methacrylic acid);

—CH₂=CH₂(derived from acrylic acid); and

—CH₂—CH₂=CH₂ (derived from 3-butenoic acid).

The preferred monounsaturated polyoxyethylene monomers are represented by Formula (I) when R is $C_{1-6}$alkyl; m=1; and R¹ is a group that is represented by the formula:

—CH₂CH₂OCO—C(CH₃)=CH₂

The most preferred monounsaturated polyoxyethylene monomer is the reaction product of IEM with methoxyPEG [R in Formula (I) is methyl, R¹ is —CH₂CH₂OCO—C(CH₃)=CH₂, and m=1].

The diunsaturated polyoxyethylene monomer(s) employed in the invention can be made in a similar manner to the method described for preparing the monounsaturated polyoxyethylene monomer, except that at least two hydroxyl groups of the polyoxyethylene monomer are reacted with a free radical reactive monoisocyanate or monocarboxylic acid (or its equivalent).

The diunsaturated polyoxyethylene monomers employed in the invention are represented by Formula (II):

$$R^1—(X)_m—CO—O(CH_2CH_2O)_n—CO—(X)_m—R^1 \qquad (II)$$

wherein n is a number having a value so that the diunsaturated polyoxyethylene monomer has a molecular weight within the range of from about 300 to about 11,000; and X, m and R¹ are as defined above in connection with the monounsaturated polyoxyethylene monomer.

The preferred diunsaturated polyoxyethylene monomers for use as component (B) in the monomer mixture are represented by Formula (II) when n is selected so that the diunsaturated polyoxyethylene monomer has a molecular weight of from about 1800 to about 5000 and R¹ is a group of the formula:

—CH₂CH₂OCO—C(CH₃)=CH₂

Another diunsaturated polyoxyethylene monomer employed in the invention is represented by the formula:

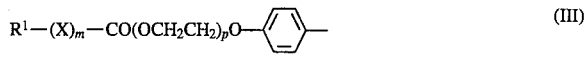
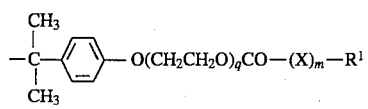
(III)

wherein $R^1$, m and X are as defined above, and p+q are selected so that the monomer represented by Formula (III) has a molecular weight within the range of from about 500 to 1900. The monomers that are represented by Formula (III) are prepared by reacting either (a) an organic monoisocyanate containing a polymerizable olefinic group, or (b) an organic monocarboxylic acid that contains a polymerizable olefinic group, with ethoxylated bisphenol A, which is commercially available. The preferred monomer represented by Formula (III) is the reaction product of isocyanatoethyl methacrylate and ethoxylated bisphenol A.

The weight ratio of monounsaturated to all of the diunsaturated polyoxyethylene monomers in the reaction mixture is desirably between about 0.01 to about 3.0, preferably about 0.02 to about 1.0. If the ratio of monounsaturated to diunsaturated polyoxyethylene monomer were greater than about 3.0, then the modulus of the lens could become undesirably low, causing a decline in the handling properties of the lens.

A hydrophilic monomer is added as a coreactant with the monounsaturated and diunsaturated polyoxyethylene monomers, and the crosslinked polymer comprises the reaction product of not only the polyoxyethylene monomers, but also the hydrophilic monomer. The hydrophilic monomers employed in the invention are selected from the group consisting of hydroxyethyl methacrylate, methacrylic acid, N,N-dimethylacrylamide, N-vinyl pyrrolidone, glycerol monomethacrylate, itaconic acid, and mixtures thereof.

In another embodiment, a fluorinated monomer can be added as a coreactant in the reaction mixture. The preferred class of fluorinated monomers are those derived from the reaction product of a free radical reactive monoisocyanate with a fluorinated alcohol. The fluorinated alcohol is preferably a monohydric alcohol, preferably an aliphatic alcohol. The preferred monohydric aliphatic alcohol is a $C_{6-30}$ alcohol. The most preferred fluorinated alcohol is perfluorooctanol $(CF_3(CF_2)_6CH_2OH)$. With respect to the free radical reactive monoisocyanate, it can be any of the monoisocyanates described previously. However, the most preferred of these is IEM, and so therefore the most preferred fluoromonomer is the reaction product of IEM with perfluorooctanol.

When it is employed, the amount of fluorinated monomer added to the reactive monomer mixture is between about 2 to about 9 percent of the weight of reactive components, preferably about 5 to about 7 weight percent. The incorporation of the fluorinated monomer may be desired for the fabrication of ophthalmic lenses because the fluorinated monomer decreases the surface energy of the finished lens to improve its resistance to deposition of ocular tear components, such as lipids and proteins. If the amount of fluorinated monomer added to the reaction mixture were less than about 2 percent, then the decrease in surface energy of a finished ophthalmic lens may not be realized. Conversely, if the amount of fluorinated monomer were greater than about 9 percent, then the optical characteristics of a finished lens may diminish, and the water content may drop as well.

The reactive components may advantageously be copolymerized with comonomers in a monomer reaction mixture to impart specific improvements in chemical and physical properties, depending on the particular application desired. For example, the equilibrium water content of an ophthalmic lens can be increased if MAA (methacrylic acid) is used as a comonomer. Similarly, other components may be added for specific applications, for example, to impart UV-absorbent properties to the finished lens.

In another embodiment, it may be desirable to add fluorinated analogs of the hydrophilic monomers described above, other fluoromonomers, and organositicone monomers, to the reaction mixture to further enhance properties. Examples of these monomers are given in U.S. Pat. No. 5,034,461.

The following formulation is an illustration of one preferred monomer mixture:

(1) From about 2 to 40 weight percent of a diunsaturated polyoxyethylene monomer represented by Formula (II):

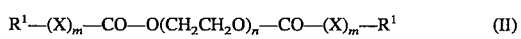
(II)

wherein n is a number having a value so that the diunsaturated polyoxyethylene monomer has a molecular weight within the range of from about 2000 to about 11,000, m=1, and X and $R^1$ are as defined above;

(2) From about 2 to 40 weight percent of a monounsaturated polyoxyethylene monomer represented by Formula (I):

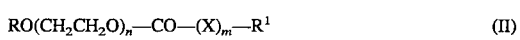
(II)

wherein $R=C_{1-4}$alkyl, m=1, n is selected so that the monomer represented by Formula (I) has a molecular weight of from about 500 to about 5500, and X and $R^1$ are as defined above;

(3) From about 0.5 to 20 weight percent of a diunsaturated polyoxyethylene monomer represented by either:

(i) Formula (III):

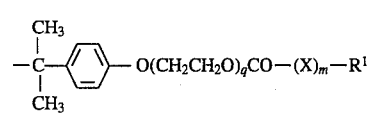
(III)

wherein $R^1$ and X are as defined above, m=1, and p+q are selected so that the monomer has a molecular weight within the range of from about 500 to 1900; or (ii) Formula (IV):

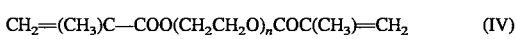
(IV)

wherein n is selected so that the monomer represented by Formula (IV) has a molecular weight of from about 300 to about 1700; or (iii) a mixture of (i) and (ii); and (4) From about 10 to 50 weight percent of a hydrophilic monomer such as HEMA, MAA, DMA (N,N-dimethylacrylamide), glycerol monomethacrylate (GMM), or a mixture thereof.

The monomer reaction mixture also includes an initiator, usually from about 0.05 to 1 percent of a free radical initiator which is thermally activated. Typical examples of such initiators include lauroyl peroxide, benzoyl peroxide, isopropyl percarbonate, azobisisobutyronitrile and known redox systems such as the ammonium persulfate-sodium metabisulfite combination and the like. Irradiation by ultraviolet light or other actinic radiation may also be employed to initiate the polymerization reaction, optionally with the addition of a polymerization initiator, e.g. benzoin and its ethers, as well as charge transfer initiators such as benzophenone/amine systems known in the art.

The polymerization of the reactive monomer mixture to form the crosslinked polymer is preferably carried out in the presence of an inert diluent. Suitable diluents for the polymerization of the reactive monomers described herein are disclosed in U.S. Pat. No. 4,889,664. The preferred diluents are the boric acid esters of dihydric alcohols. The most preferred boric acid esters are those esters of polyethylene glycols, specifically, the boric acid ester of polyethylene glycol 400. The preferred amount of the boric acid ester of polyethylene glycol is between about 25 to about 65 weight percent of the reactive components, and the most preferred amount is between 35 to 50 weight percent. Additional diluents that can be employed are those disclosed by Ivan M. Nunez et al., in copending application Ser. No. 08/096,145, filed on Jul. 22, 1993, and assigned to the same assignee as this application. The disclosure of Nunez et al. is incorporated herein by reference. Briefly, these diluents are the following:

(i) ethoxylated alkyl glucoside;

(ii) ethoxylated bisphenol A;

(iii) polyethylene glycol;

(iv) mixture of propoxylated and ethoxylated alkyl glucoside;

(v) single phase mixture of ethoxylated or propoxylated alkyl glucoside and $C_{2-12}$ dihydric alcohol;

(vi) adduct of e-caprolactone and $C_{2-6}$alkanediols and triols;

(vii) ethoxylated $C_{3-6}$alkanetriol; and (viii) mixtures of one or more of (i) through (vii).

When the polymerization reaction to prepare the lens is sufficiently complete, the lens can be hydrated to its equilibrium water content. Preferably, the water content of the lens will range from about 35 to about 80 weight percent, more preferably from about 55 to about 70 weight percent.

The following examples set forth illustrative embodiments of this invention.

Some of the materials that are employed in the Examples are identified as follows:

Ethoxylated Bisphenol A (ethoxylated 2,2-bis(4-hydroxyphenyl)propane)— "Photonol 7025"(m+n in the following formula total 8):

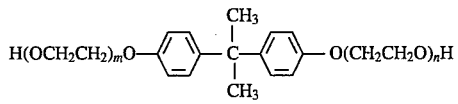

4-Methoxyphenol (hydroquinone monomethyl ether)— "MEHQ";

Isocyanatoethyl methacrylate—"IEM";

N, N-dimethylacrylamide—"DMA";

Polyethylene glycol—"PEG nnnn" wherein the "nnnn" refers to the molecular weight;

Polyethylene glycol 1000 dimethacrylate—"PEG 1000 XL";

Ethoxylated methyl glucoside—"GLUCAM's E-10 and E-20" —("E-10" signifies a total of 10 ethylene oxide units added to methyl glucoside, etc.);

Isophoronediisocyanate(5-isocyanato-1-(isocyanatomethyl)-1,3,3,-trimethylcyclohexane)— "IPDI";

Polyethylene glycol nnn boric acid ester—"PEG nnn BAE" wherein the nnn refers to the molecular weight of the PEG;

Hydroxyethyl methacrylate—"HEMA";

Glycerol monomethacrylate—"GMM";

Methacrylic acid—"MAA";

Ethylene glycol dimethacrylate—"EGDMA";

Trimethylolpropane trimethacrylate—"TMPTMA";

2-hydroxy-2-methyl-1-phenyl-propan-1-one—"DAROCURE 1173";

Test methods

Test Method 1

Oxygen Permeability (Dk)

The oxygen permeability through the lens is expressed as the Dk value multiplied by $10^{11}$, in units of $cm^2$ ml $O_2$/s ml mm Hg. It is measured using a polagraphic oxygen sensor consisting of a 4 mm diameter gold cathode and silver-silver chloride ring anode.

Test Method 2

Tensile Properties (Modulus, Elongation and Strength)

The lens to be tested is cut to the desired specimen size and shape and the cross-sectional area measured. The specimen is then attached into the upper grip of a constant rate-of-crosshead-movement type of testing machine equipped with a load cell. The crosshead is lowered to the initial gauge length and the specimen attached to the fixed grip. The specimen is then elongated at a constant rate of strain and the resulting stress-strain curve is recorded. The elongation is expressed in percent and the tensile modulus and strength is expressed in psi (pounds per square inch).

Test Method 3

Gravimetric Water Content (Equilibrium Water Content—EWC)

Flat discs are made which weigh approximately 0.05–0.10 gram. These discs are hydrated (to equilibrium) in DI $H_2O$ then dehydrated and the dry polymer weight is obtained. The discs are then hydrated in physiological saline (to equilibrium) and the weight obtained. The equilibrium water content is expressed as a percent difference.

$$\frac{(Dry\ Polymer + Saline) - (Dry\ Polymer)}{(Dry\ Polymer + Saline)} \times 100$$

EXAMPLE 1 (Synthesis of diunsaturated polyethylene glycol (PEG) 4000 or PEG 4000XL)

200G (0.050 mol) of dry PEG 4000 is placed into a 1 L 3-neck flask equipped with mechanical agitation, and gas-inlet tube. The system is flushed with dry $N_2$ and then dry $O_2$. To the PEG 4000 are added 375 g of dry acetonitrile; they are mixed until the PEG 4000 has completely dissolved. Then, 2 drops of stannous octoate and 500 ppm MEHQ are added. Via a dropping funnel are added 15.52 g (0.100 mol) of IEM. The reaction is allowed to proceed at room temperature for 24–28 hours. Progress of the reaction is followed by disappearance of the NCO absorption at 2270 $cm^{-1}$ in the infrared spectra. The acetonitrile is removed under reduced pressure and the white waxy diunsaturated PEG is used as is.

EXAMPLE 2 Synthesis of Inert Diluent/PEG 400 BAE

A total of 400g (1 mol) of polyethylene glycol 400 (PEG 400) is placed into a 2 L rotary evaporator flask. To the flask are added 108.2 g (1.75 mol) of boric acid. The flask is placed on a rotary evaporator and the pressure slowly reduced (<0.05–1 mm Hg). After full vacuum is established the temperature of the bath is slowly raised to 92° C. Water is recovered from the reaction as the boric acid ester is formed. The clear viscous liquid is used as is.

EXAMPLE 3

A blend is prepared of 58.86% hydroxyethyl methacrylate (HEMA), 0.90% of the diunsaturated PEG 4000 of Example 1, 0.24% Darocur 1173, and 40% of PEG 400 BAE. The above blend is mixed at 40° C for thirty minutes under reduced pressure (<10 mm Hg) then transferred to a contact lens mold. The filled mold is exposed to UV light (wavelength=300–380nm, Dose=1.2–1.6 Joules/cm$^2$) for twenty minutes at approximately 60° C. The lens molds are then separated and placed in distilled water at 50° C for three to four hours. After the initial hydration period the lenses are allowed to equilibrate in physiological saline. The lenses are tested by test methods 1, 2 and 3. The results are shown in Table 1.

EXAMPLE 4

Contact lenses are made from a blend of 56.76% HEMA, 3.00% of the diunsaturated PEG 4000, 0.24% Darocur 1173 initiator, and 40% of PEG 400 BAE. This blend is treated as taught in Example 3 and tested by Methods 1, 2 and 3; results are shown in Table 1.

EXAMPLE 5

Contact lenses are made from a blend of 53.76% HEMA, 6.00% of the diunsaturated PEG 4000, 0.24% Darocur 1173, and 40% of PEG 400 BAE. This blend is treated as taught in Example 3 and tested by Methods 1, 2 and 3; results are shown in Table 1.

EXAMPLE 6

Contact lenses are made from a blend of 50.76% HEMA, 9.00% of the diunsaturated PEG 4000, 0.24% Darocur 1173, and 40% of PEG 400 BAE. This blend is treated as taught in Example 3 and tested by Methods 1, 2 and 3; results are shown in Table 1.

EXAMPLE 7

Contact lenses are made from a blend of 47.76% HEMA, 12.00% of the diunsaturated PEG 4000, 0.24% Darocur 1173, and 40% of PEG 400 BAE. This blend is treated as taught in Example 3 and tested by Methods 1, 2 and 3; results are shown in Table 1.

EXAMPLE 8

Contact lenses are made from a blend of 48.76% HEMA, 15.00% of the diunsaturated PEG 4000, 0.24% Darocur 1173, and 40% of PEG 400 BAE. This blend is treated as taught in Example 3 and tested by Methods 1, 2 and 3; results are shown in Table 1.

EXAMPLE 9

Contact lenses are made from a blend of 41.76% HEMA, 18.00% of the diunsaturated PEG 4000, 0.24% Darocur 1173, and 40% of PEG 400 BAE. This blend is treated as taught in Example 3 and tested by Methods 1, 2 and 3; results are shown in Table 1.

EXAMPLE 10

Contact lenses are made from a blend of 48.76% HEMA, 21.00% of the diunsaturated PEG 4000, 0.24% Darocur 1173, and 40% of PEG 400 BAE. This blend is treated as taught in Example 3 and tested by Methods 1, 2 and 3; results are shown in Table 1.

TABLE 1

PROPERTIES OF SOFT HYDROGEL CONTACT LENSES

| Example # | % DCPEG[1] | % EWC | Modulus psi | Elongation % | Tensile % | Dk |
|---|---|---|---|---|---|---|
| Example 3 | 1.5 | 45 | 46 | 322 | 76 | 13 |
| Example 4 | 5 | 47 | 49 | 308 | 80 | 14 |
| Example 5 | 10 | 49 | 62 | 270 | 86 | 17 |
| Example 6 | 15 | 51 | 68 | 321 | 110 | 20 |
| Example 7 | 20 | 55 | 71 | 216 | 85 | 22 |
| Example 8 | 25 | 58 | 73 | 203 | 87 | 25 |
| Example 9 | 30 | 60 | 73 | 160 | 77 | 27 |
| Example 10 | 35 | 63 | 78 | 139 | 73 | 31 |

[1]DCPEG is diunsaturated PEG4000.

As can be seen from Table 1, as the diunsaturated PEG 4000 is increased, the water content, modulus, and $O_2$ permeability of the lens increase. Note that the examples reflect the diluent in the monomer formulations where the tables show the percentage of the monomer and crosslinker present in the polymer.

EXAMPLE 11 (Synthesis of monounsaturated polyethylene glycol (PEG) or PEG 3350MC)

200G (0.060 mol) of dry PEG 3350 is placed in a 1 L three neck flask equipped with mechanical agitation, and gas-inlet tube. The system is flushed with dry $N_2$ and then dry 02. To the PEG 3350 are added g of dry acetonitrile; they are mixed until the PEG 3350 has completely dissolved. Subsequently, 2 drops of stannous octoate and 500 ppm MEHQ are added. Via a dropping funnel are added 8.69 g (0.056 mol) of IEM. The reaction is allowed to proceed at room temperature for 24–28 hours. The progress of the reaction is followed by disappearance of NCO absorption at 2270 cm$^{-1}$ in the infrared spectra. The acetonitrile is removed under reduced pressure and the white waxy monounsaturated PEG 3350 is used as is.

EXAMPLE 12

A blend is prepared of 56.76% hydroxyethyl methacrylate (HEMA), 3.0% of the monounsaturated PEG 3350 of Example 11, 0.24% Darocur 1173, and 40% of PEG 400 BAE. The above blend is mixed at 40° C for thirty minutes under reduced pressure (<10 mm Hg) then transferred to a contact lens mold. The filled mold is exposed to UV light (wavelength=300–380 nm, Dose=1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are tested by Methods 1, 2 and 3; results are shown in Table 2.

EXAMPLE 13

Contact lenses are made from a blend of 53.16% HEMA, 6.60% of the monounsaturated PEG 3350, 0.24% Darocur 1173, and 40% of PEG 400 BAE. This blend is treated as taught in Example 3 and tested by Methods 1, 2 and 3; results are shown in Table 2.

EXAMPLE 14

Contact lenses are made from a blend of 49.56% HEMA, 10.20% of the monounsaturated PEG 3350, 0.24% Darocur 1173, and 40% of PEG 400 BAE. This blend is treated as taught in Example 3 and tested by Methods 1, 2 and 3; results are shown in Table 2.

EXAMPLE 15

Contact lenses are made from a blend of 42.96% HEMA, 16.80% of the monounsaturated PEG 3350, 0.24% Darocur 1173, and 40% of PEG 400 BAE. This blend is treated as taught in Example 3 and tested by Methods 1, 2 and 3; results are shown in Table 2.

TABLE 2

PROPERTIES OF SOFT HYDROGEL CONTACT LENSES

| Example # | % MCPEG[1] | % EWC | Modulus psi | Elongation % | Tensile psi | Dk |
|---|---|---|---|---|---|---|
| Example 12 | 5 | 47 | 42 | 276 | 52 | 11 |
| Example 13 | 11 | 52 | 35 | 315 | 50 | 18 |
| Example 14 | 17 | 58 | 34 | 240 | 44 | 19 |
| Example 15 | 28 | 67 | 34 | 215 | 46 | 29 |

[1]MCPEG is monounsaturated PEG3350.

As can be seen from Table 2, as the monounsaturated PEG 3350 is increased, the water content and oxygen permeability increase but the modulus decreases.

EXAMPLE 16

A blend is prepared of 53.76% HEMA, 3.0% of the monounsaturated PEG 3350 of Example 11, 3.0% of the diunsaturated PEG 4000 of Example 3, 0.24% Darocur 1173, and 40% of PEG 400 BAE. The blend is mixed at 40° C. for thirty minutes under reduced pressure (<10 mm Hg) then transferred to a contact lens mold. The filled mold is exposed to UV light (wavelength=300–380 nm, Dose= 1.2–1.6 Joules/cm$^2$) for 20 minutes at approximately 60° C. The lens molds are then separated and placed into distilled water at 50° C. for three to four hours. After the initial hydration period the lenses are allowed to equilibrate in physiological saline. The lenses are tested by Methods 1, 2 and 3; results are shown in Table 3.

EXAMPLE 17

Contact lenses are made from a blend of 50.16% HEMA, 6.6% of the monounsaturated PEG 3350, 3.00% of the diunsaturated PEG 4000, 0.24% Darocur 1173, and 40% of PEG 400 BAE. This blend is treated as taught in Example 3 and tested by Methods 1, 2 and 3; results are shown in Table 3.

EXAMPLE 18

Contact lenses are made from a blend of 46.80% HEMA, 10.2% of the monounsaturated PEG 3350, 3.00% of the diunsaturated PEG 4000, 0.24% Darocur 1173, and 40% of PEG 400 BAE. This blend is treated as taught in Example 3 and tested by Methods 1, 2 and 3; results are shown in Table 3.

EXAMPLE 19

Contact lenses are made from a blend of 40.80% HEMA, 16.8% of monounsaturated PEG 3350, 3.00% of diunsaturated PEG 4000, 0.24% Darocur 1173, and 40% of PEG 400 BAE. This blend is treated as taught in Example 3 and tested by Methods 1, 2 and 3; results are shown in Table 3.

TABLE 3

PROPERTIES OF SOFT HYDROGEL CONTACT LENSES

| Example # | % MCPEG | % EWC | Modulus psi | Elongation % | Tensile psi | Dk |
|---|---|---|---|---|---|---|
| Example 16 | 5 | 54 | 38 | 184 | 41 | 15 |
| Example 17 | 11 | 57 | 37 | 193 | 45 | 19 |
| Example 18 | 17 | 62 | 37 | 254 | 54 | 23 |
| Example 19 | 28 | 70 | 38 | 238 | 53 | 31 |

As can be seen from Table 3, if the diunsaturated PEG 4000 is held constant at 5% of the monomer mixture and the monounsaturated PEG 3350 is increased the water content and Dk of the polymer can be increased without an increase in modulus.

EXAMPLE 20 Synthesis of diunsaturated ethoxylated Bisphenol A (BPA 890)

To a 5 L three neck round bottom flask are added 728 g (1.255 mol) of dried Photonol 7025 (molecular weight=580 g/mol), 1.5 L of dry acetonitrile, 1.0 g of MEHQ and 0.5 g of stannous octoate (approximately 0.1 mol% relative to diol). After these components are added, the resulting solution is purged with dry $O_2$ for 30–45 minutes (using a gas diffuser). After the $O_2$ purge is completed, 365 g (2.35 mol) of IEM and 730 g of acetonitrile are charged to a 1 L addition funnel (this operation is best carried out under $N_2$).

The contents of the addition funnel (i.e. the IEM solution) are then added, dropwise with vigorous stirring, to the 5 L round bottom flask. The addition should take about 2–3 hours to complete. After the IEM addition is complete, the addition funnel is rinsed with 50–100 mL of acetonitrile. The progress of the reaction is monitored by following the disappearance of the NCO absorption at 2270 cm$^{-1}$ in the infrared spectra. The acetonitrile is removed under reduced pressure and the resultant viscous liquid diunsaturated bisphenol A 890 is used as prepared.

EXAMPLE 21

A blend is prepared of 59.16% HEMA, 0.3% of the diunsaturated BPA 890 of Example 20, 0.24% Darocur 1173, and 40% of PEG 400 BAE. The blend is mixed at 40° C. for 30 minutes under reduced pressure (<10 mm Hg) then transferred to a contact lens mold. The filled mold is exposed to UV light (wavelength=300–380 nm, Dose=1.2–1.6 Joules/cm$^2$) for twenty minutes at approximately 60° C. The lens molds are then separated and placed in distilled water at 50° C. for three to four hours. After the initial hydration period the lenses are allowed to equilibrate in physiological saline. The lenses are now tested by Methods 1, 2 and 3; results are shown in Table 4.

EXAMPLE 22

Contact lenses are made from a blend of 59.46% HEMA, 0.6% of the diunsaturated BPA 890 prepared in Example 20, 0.24% Darocur 1173, and 40% of PEG 400 BAE. This blend is treated as taught in Example 3 and tested by Methods 1, 2 and 3; results are shown in Table 4.

EXAMPLE 23

Contact lenses are made from a blend of 58.5% HEMA, 1.26% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 24

Contact lenses are made from a blend of 57.66% HEMA, 2.10% of the diunsaturated BPA 890 of Example 20, 0.24% Darocur 1173, and 40% of PEG 400 BAE. This blend is treated as taught in Example 3 and tested by Methods 1, 2 and 3; results are shown below in Table 4.

EXAMPLE 25

Contact lenses are made from a blend of 57.06% HEMA, 2.70% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 26

Contact lenses are made from a blend of 56.34% HEMA, 3.40% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 27

Contact lenses are made from a blend of 56.16% HEMA, 3.60% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 28

Contact lenses are made from a blend of 55.86% HEMA, 3.90% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 29

Contact lenses are made from a blend of 55.56% HEMA, 4.20% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

EXAMPLE 30

Contact lenses are made from a blend of 54.96% HEMA, 4.8% of the diunsaturated BPA 890 of Example 20, 0.24% Darocur 1173, and 40% of PEG 400 BAE. This blend is treated as taught in Example 3 and tested by Methods 1, 2 and 3; results are shown in Table 4.

TABLE 4

PROPERTIES OF SOFT HYDROGEL CONTACT LENSES

| Example # | % BPA890 | % EWC | Modulus psi | Elongation % | Tensile psi | Dk |
|---|---|---|---|---|---|---|
| Example 21 | 0.5 | 40 | 60 | 543 | 130 | 11 |
| Example 22 | 1.0 | 39 | 58 | 368 | 80 | 10 |
| Example 23 | 2.1 | 38 | 66 | 214 | 93 | 10 |
| Example 24 | 3.5 | 37 | 67 | 180 | 88 | 8 |
| Example 25 | 4.5 | 36 | 73 | 163 | 97 | 7 |
| Example 26 | 5.7 | 36 | 79 | 152 | 101 | 7 |
| Example 27 | 6.0 | 35 | 83 | 133 | 94 | 6 |
| Example 28 | 6.5 | 35 | 79 | 132 | 100 | 6 |
| Example 29 | 7.0 | 35 | 87 | 118 | 104 | 6 |
| Example 30 | 8.0 | 35 | 83 | 124 | 101 | 6 |

As can be seen from Table 4, an increase in the BPA 890 decreases the water content and Dk a small amount, but increases the modulus of the resulting polymer dramatically.

EXAMPLE 31 (Synthesis of Fluoro Monomer (FM))

200G (0,050 mol) of dry perfluoro-1-octanol is placed into a 1 L three neck flask equipped with mechanical agitation, and gas-inlet tube. The system is flushed with dry nitrogen and then dry oxygen. To this fluoro alcohol are added 375 g of dry acetonitrile and allowed to mix for fifteen minutes. Subsequently, 2 drops of stannous octoate are added to the acetonitrile/perfluoro-1-octanol mixture. Via a dropping funnel are added 15.52 g (0,100 mol) of IEM. The reaction is allowed to proceed at room temperature for 24–28 hours. The progress of the reaction is followed by the disappearance of the NCO absorption at 2270 $cm^{-1}$ in the infrared spectra. The acetonitrile is removed under reduced pressure and the resultant white waxy fluoromonomer is used as is.

EXAMPLE 32

A blend is prepared of 42.36% HEMA, 12.0% DMA, 5.4% of the perfluoromonomer of Example 31, 0.24% Darocur 1173, and 40% of PEG 400 BAE. The above blend is mixed at 40° C. for 30 minutes under reduced pressure (<10 mm Hg) then transferred to a contact lens mold. The filled mold is exposed to UV light (wavelength=300–380 nm, Dose =1.2–1.6 Joules/$cm^2$) for 20 minutes at approximately 60° C. The lens molds are then separated and placed into distilled water at 50° C. for 3–4 hours. After the initial hydration period the lenses are allowed to equilibrate in physiological saline. The lenses are now tested by Methods 1, 2 and 3; results are shown in Table 5.

EXAMPLE 33

Contact lenses are made from a blend of 39.96% HEMA, 12.0% DMA, 7.8% of the perfluoromonomer of Example 31, 0.24% Darocur 1173, and 40% PEG 400 BAE. The blend is treated as taught in Example 32 and tested by Methods 1, 2 and 3; results are shown in Table 5.

EXAMPLE 34

Contact lenses are made from a blend of 36.96% HEMA, 12.0% of DMA, 10.8% of the fluoromonomer of Example 31, 0.24% Darocur 1173, and 40% of PEG 400 BAE. This blend is treated as taught in Example 32 and tested by Methods 1, 2 and 3; results are shown in Table 5.

EXAMPLE 35

A blend is prepared of 38.28% HEMA, 12.0% DMA, 3.6% of the diunsaturated PEG 4000 of Example 1, 3.0% of the monounsaturated PEG 3350 of Example 11, 1.08% of the diunsaturated BPA of Example 20, 1.8% of the fluoromonomer of Example 31, 0.24% Darocur 1173, and 40% of PEG 400 BAE. The above blend is mixed at 40° C. for forty-five minutes under reduced pressure (<10 mm Hg) then transferred to a contact lens mold. The filled mold is exposed to UV light (wavelength=300–380 nm, Dose= 1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are tested by Methods 1, 2 and 3; results are shown in Table 5.

EXAMPLE 36

Contact lenses are made from a blend of 34.68% HEMA, 12.0% of DMA, 5.4% of the fluoromonomer of Example 31, 3.6% of the diunsaturated PEG 4000 of Example 1, 3.0% of the monounsaturated PEG 3350 of Example 11, 1.08% of the diunsaturated BPA of Example 20, 0.24% Darocur 1173, and 40% of PEG 400 BAE. This blend is treated as taught in Example 35 and tested by Methods 1, 2 and 3; results are shown in Table 5.

EXAMPLE 37

Contact lenses are made from a blend of 31.68% HEMA, 12.0% of DMA, 8.4% of the fluoromonomer of Example 31, 3.6% of the diunsaturated PEG 4000 of Example 1, 3.0% of the monounsaturated PEG 3350 of Example 11, 1.08% of the diunsaturated BPA of Example 20, 0.24% Darocur 1173, and 40% of PEG 400 BAE. This blend is treated as taught in Example 35 and tested by Methods 1, 2 and 3; results are shown in Table 5.

EXAMPLE 38

Contact lenses are made from a blend of 27.48% HEMA, 12.0% of DMA, 12.6% of the fluoromonomer of Example 31, 3.6% of the diunsaturated PEG 4000 of Example 1, 3.0% of the monounsaturated PEG 3350 of Example 11, 1.08% of the diunsaturated BPA of Example 20, 0.24% Darocur 1173, and 40% of PEG 400 BAE. This blend is treated as taught in Example 35 and tested by Methods 1, 2 and 3; results are shown in Table 5.

TABLE 5
PROPERTIES OF SOFT HYDROGEL CONTACT LENSES

| Example # | % FM[1] | % EWC | Modulus psi | Elongation % | Tensile psi | Dk |
|---|---|---|---|---|---|---|
| Example 32 | 9 | 54 | 42 | 421 | 65 | 19 |
| Example 33 | 13 | 53 | 49 | 495 | 104 | 18 |
| Example 34 | 18 | 49 | 65 | 493 | 122 | 17 |
| Example 35 | 3 | 63 | 41 | 288 | 87 | 25 |
| Example 36 | 9 | 60 | 59 | 253 | 103 | 24 |
| Example 37 | 14 | 59 | 62 | 257 | 114 | 22 |
| Example 38 | 21 | 53 | 75 | 218 | 112 | 21 |

[1]FM is fluoromonomer.

As can be seen from Table 5, the fluoromonomer lowers the water content and interacts with itself through hydrophobic interactions resulting in pseudocrosslinks giving the material the same effect as if a polyfunctional crosslinker were present.

EXAMPLE 39

A blend is prepared of 26.64% HEMA, 12.0% DMA, 9.0% of the diunsaturated PEG 4000 of Example 1, 4.2% of the monounsaturated PEG 3350 of Example 11, 3.72% of the diunsaturated BPA of Example 20, 4.2% of the fluoromonomer of Example 31, 0.24% Darocur 1173, and 40% of PEG 400 BAE. The above blend is mixed at 55° C. for forty-five minutes under reduced pressure (<10 mm Hg) then transferred to a contact lens mold. The filled mold is exposed to UV light (wavelength=300–380 nm, Dose= 1.2–1.6 Joules/cm$^2$) for thirty-five minutes at approximately 65° C. The lens molds are then separated and placed into distilled water at 50° C. for three to four hours. After the initial hydration period the lenses are allowed to equilibrate in physiological saline. The lenses are now tested by Methods 1, 2 and 3; results are shown in Table 6.

EXAMPLE 40

Contact lenses are made from a blend of 21.48% HEMA, 12.0% DMA, 4.2% of fluoromonomer (Example 31), 9.0% of diunsaturated PEG 4000 (Example 1), 9.0% of monounsaturated PEG 3350 (Example 11), 3.72% of the diunsaturated BPA of Example 20, 0.24% Darocur 1173, and 40% PEG 400 BAE. The blend is treated as taught in Example 39 and tested by Methods 1, 2 and 3; results are shown in Table 6.

EXAMPLE 41

Contact lenses are made from a blend of 16.44% HEMA, 12.0% of DMA, 4.2% of fluoromonomer (Example 31), 9.0% of diunsaturated PEG 4000 (Example 1), 14.4% of monounsaturated PEG 3350 (Example 11), 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

EXAMPLE 42

Contact lenses are made from a blend of 9.2% HEMA, 12.0% of DMA, 4.2% of fluoromonomer (Example 31), 9.0% of diunsaturated PEG 4000 (Example 1), 21.6% of monounsaturated PEG 3350 (Example 11), 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

EXAMPLE 43

Contact lenses are made from a blend of 22.44% HEMA, 12.0% of DMA, 4.2% of fluoromonomer (Example 31), 13.2% of diunsaturated PEG 4000 (Example 1), 4.2% of the monounsaturated PEG 3350 of Example 11, 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

EXAMPLE 44

Contact lenses are made from a blend of 17.64% HEMA, 12.0% of DMA, 4.2% of fluoromonomer (Example 31), 13.2% of diunsaturated PEG 4000 (Example 1), 9.0% of the monounsaturated PEG 3350 of Example 11, 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

EXAMPLE 45

Contact lenses are made from a blend of 12.24% HEMA, 12.0% of DMA, 4.2% of fluoromonomer (Example 31), 13.2% of diunsaturated PEG 4000 (Example 1), 14.4% of the monounsaturated PEG 3350 of Example 11, 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

EXAMPLE 46

Contact lenses are made from a blend of 5.04% HEMA, 12.0% of DMA, 4.2% of fluoromonomer (Example 31), 13.2% of diunsaturated PEG 4000 (Example 1), 21.6% of the monounsaturated PEG 3350 of Example 11, 3.72% of the diunsaturated BPA of Example 20, 0.24% Darocur 1173, and 40% of PEG 400 BAE. This blend is treated as taught in Example 39 and tested by Methods 1, 2 and 3; results are shown in Table 6.

TABLE 6

PROPERTIES OF SOFT HYDROGEL CONTACT LENSES

| Example # | % EWC | Modulus psi | Elongation, % | Tensile, psi | Dk |
|---|---|---|---|---|---|
| Example 39 | 59 | 85 | 194 | 108 | 31 |
| Example 40 | 63 | 83 | 183 | 106 | 34 |
| Example 41 | 68 | 80 | 161 | 95 | 42 |
| Example 42 | 73 | 77 | 146 | 89 | 52 |
| Example 43 | 63 | 80 | 163 | 98 | 35 |
| Example 44 | 67 | 79 | 178 | 113 | 44 |
| Example 45 | 71 | 79 | 152 | 96 | 48 |
| Example 46 | 76 | 71 | 176 | 80 | 59 |

As can be seen from the data presented in Table 6, monomers containing diunsaturated PEG 4000, monounsaturated PEG 3350, BPA 890, DMA, and fluoromonomer afford contact lenses with excellent modulus even at higher water contents.

EXAMPLE 47 (Synthesis of monounsaturated monomethoxy polyethylene glycol (mPEG) 2000)

200G (0.10 mol) of dry mPEG 2000 is placed into a 1 L three neck flask equipped with mechanical agitation, and gas-inlet tube. The system is flushed with dry $N_2$ and then dry 02. To this mPEG 2000 are added 600 g of dry acetonitrile; they are mixed until the mPEG 2000 has completely dissolved. Two drops of stannous octoate and 500 ppm MEHQ are then added. Via a dropping funnel are added 15.51 g (0.10 mol) of IEM. The reaction is allowed to proceed at room temperature for 24–28 hours. Progress of the reaction is followed by the disappearance of the NCO absorption at 2270 $cm^{-1}$ in the IR spectra. The acetonitrile is removed under reduced pressure and the white waxy monounsaturated mPEG 2000 is used as is.

EXAMPLE 48 (Synthesis of monounsaturated monomethoxy polyethylene glycol (mPEG) 5000)

200G (0.04 mol) of dry mPEG 5000 is placed into a 1 L three neck flask equipped with mechanical agitation, and gas-inlet tube. The system is flushed with dry $N_2$ and then dry $O_2$. To the mPEG 5000 are added 600 g of dry acetonitrile; they are mixed until the mPEG 5000 has completely dissolved. Two drops of stannous octoate and 500 ppm MEHQ are then added. Via a dropping funnel are added 6.20 g (0.10 mol) of IEM. The reaction is allowed to proceed at room temperature for 24–28 hours. Progress of the reaction is followed by the disappearance of the NCO absorption at 2270 $cm^{-1}$ in the IR spectra. The acetonitrile is removed under reduced pressure and the white waxy monounsaturated mPEG 5000 is used as is.

EXAMPLE 49 (Synthesis of diunsaturated polyethylene glycol (PEG) 4500)

200G (0.0440 mol) of dry PEG 4500 is placed into a 1 L three neck flask equipped with mechanical agitation, and gas-inlet tube. The system is flushed with dry $N_2$ and then dry $O_2$. To the PEG 4500 are added 375 g of dry acetonitrile; they are mixed until the PEG 4500 has completely dissolved. Two drops of stannous octoate and 500 ppm MEHQ are then added. Via a dropping funnel are added 13.65 g (0.0880 mol) of IEM. The reaction is allowed to proceed at room temperature for 24–28 hours. The progress of the reaction is followed by the disappearance of the NCO absorption at 2270 $cm^{-1}$ in the IR spectra. The acetonitrile is removed under reduced pressure and the resultant white waxy diunsaturated PEG 4500 is used as is.

EXAMPLE 50

A blend is prepared of 22.86% HEMA, 12.0% DMA, 10.2% diunsaturated PEG 4500 (Example 49), 1.5% monounsaturated mPEG 2000 (Example 47), 9.0% diunsaturated BPA (Example 20), 4.2% fluoromonomer (Example 31), 0.24% Darocur 1173, and 40% PEG 400 BAE. The blend is mixed at 65° C. for 45 minutes under reduced pressure (<5 mm Hg) then transferred to a contact lens mold. The filled mold is exposed to UV light (wavelength= 300–380 nm, Dose=1.2–1.6 Joules/$cm^2$) for forty minutes at approximately 65° C. The lens molds are then separated and placed into distilled water at 50° C. for three to four hours. After the initial hydration period the lenses are allowed to equilibrate in physiological saline. The lenses are now tested by Methods 1, 2 and 3; results are shown in Table 7.

EXAMPLE 51

Contact lenses are made from a blend of 20.76% HEMA, 12.0% DMA, 4.2% fluoromonomer (Example 31), 10.2% diunsaturated PEG 4500 (Example 49), 3.6% of the monounsaturated mPEG 2000 of Example 47, 9.0% of the diunsaturated BPA of Example 20, 0.24% Darocur 1173, and 40% of PEG 400 BAE. This blend is treated as taught in Example 50 and tested by Methods 1, 2 and 3; results are shown in Table 7.

EXAMPLE 52

Contact lenses are made from a blend of 15.96% HEMA, 12.0% DMA, 4.2% fluoromonomer (Example 31), 10.2% diunsaturated PEG 4500 (Example 49), 8.4% of the monounsaturated mPEG 2000 of Example 47, 9.0% of the diunsaturated BPA of Example 20, 0.24% Darocur 1173, and 40% of PEG 400 BAE. This blend is treated as taught in Example 50 and tested by Methods 1, 2 and 3; results are shown in Table 7.

EXAMPLE 53

Contact lenses are made from a blend of 7.56% HEMA, 12.0% DMA, 4.2% fluoromonomer (Example 31), 10.2% of the diunsaturated PEG 4500 of Example 49, 16.8% of the monounsaturated mPEG 2000 of Example 47, 9.0% of the diunsaturated BPA of Example 20, 0.24% Darocur 1173, and 40% of PEG 400 BAE. This blend is treated as taught in Example 50 and tested by Methods 1, 2 and 3; results are shown in Table 7.

EXAMPLE 54

Contact lenses are made from a blend of 12.06% HEMA, 12.0% DMA, 4.2% fluoromonomer (Example 31), 21.0% diunsaturated PEG 4500 (Example 49), 1.5% of the monounsaturated mPEG 2000 of Example 47, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 55

Contact lenses are made from a blend of 9.96% HEMA, 12.0% DMA, 4.2% fluoromonomer (Example 31), 21.0% of the diunsaturated PEG 4500 of Example 49, 3.6% of the monounsaturated mPEG 2000 of Example 47, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 56

Contact lenses are made from a blend of 5.16% HEMA, 12.0% DMA, 4.2% fluoromonomer (Example 31), 21.0% of the diunsaturated PEG 4500 of Example 49, 8.4% of the monounsaturated mPEG 2000 of Example 47, 9.0% of the diunsaturated BPA of Example 20, 0.24% Darocur 1173, and 40% of PEG 400 BAE. This blend is treated as taught in Example 0 and tested by Methods 1, 2 and 3; results are shown in Table 7.

EXAMPLE 57

Contact lenses are made from a blend of 11.38% DMA, 3.98% fluoromonomer (Example 31), 19.92% of the diunsaturated PEG 4500 of Example 49, 15.94% of the monounsaturated mPEG 2000 of Example 47, 8.54% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 58

Contact lenses are made from a blend of 22.86% HEMA, 12.0% DMA, 4.2% fluoromonomer (Example 31), 10.2% diunsaturated PEG 4500 (Example 49), 1.5% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 59

Contact lenses are made from a blend of 20.76% HEMA, 12.0% DMA, 4.2% fluoromonomer (Example 31), 10.2% diunsaturated PEG 4500 (Example 49), 3.6% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 60

Contact lenses are made from a blend of 15.96% HEMA, 12.0% DMA, 4.2% fluoromonomer (Example 31), 10.2% diunsaturated PEG 4500 (Example 49), 8.4% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 61

Contact lenses are made from a blend of 7.56% HEMA, 12.0% DMA, 4.2% fluoromonomer (Example 31), 10.2% of the diunsaturated PEG 4500 of Example 49, 16.8% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 62

Contact lenses are made from a blend of 12.06% HEMA, 12.0% DMA, 4.2% fluoromonomer (Example 31), 21.0% diunsaturated PEG 4500 (Example 49), 1.5% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 63

Contact lenses are made from a blend of 9.96% HEMA, 12.0% DMA, 4.2% fluoromonomer (Example) 31, 21.0% of the diunsaturated PEG 4500 of Example 49, 3.6% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 64

Contact lenses are made from a blend of 5.1% HEMA, 12.0% DMA, 4.2% fluoromonomer (Example 31), 21.0% of the diunsaturated PEG 4500 of Example 49, 8.4% of the monounsaturated mPEG 5000 of Example 48, 9.0% of the diunsaturated BPA of Example 20, 0.24% Darocur 1173, and 40% PEG 400 BAE. This blend is treated as taught in Example 50 and tested by Methods 1, 2 and 3; results are shown in Table 7.

EXAMPLE 65

Contact lenses are made from a blend of 11.38% DMA, 3.98% fluoromonomer (Example 31), 19.92% of the diunsaturated PEG 4500 of Example 49, 15.94% of the monounsaturated mPEG 5000 of Example 48, 8.53% of the diunsaturated BPA of Example 20, 0.24% Darocur 1173, and 40% PEG 400 BAE. This blend is treated as taught in Example 50 and tested by Methods 1, 2 and 3; results are shown in Table 7.

BPA (Example 20), 0.17% Darocur 1173, and 50% PEG 400 BAE. This blend is treated as taught in Example 50 and tested by Methods 1, 2 and 3; results are shown in Table 8.

EXAMPLE 68

Contact lenses are made from a blend of 9.83% HEMA, 10.0% DMA, 1.25% fluoromonomer (Example 31), 25.0% diunsaturated PEG 4500 (Example 49), 2.5% monounsaturated PEG (Example 11), 1.25% diunsaturated BPA (Example 20), 0.17% Darocur 1173, and 50% PEG 400 BAE. This blend is treated as taught in Example 50 and tested by Methods 1, 2 and 3; results are shown in Table 8.

EXAMPLE 69

Contact lenses are made from a blend of 9.66% HEMA, 15.0% DMA, 25.0% diunsaturated PEG 4500 (Example 49), 5.0% diunsaturated BPA (Example 20), 0.17% Darocur 1173, and 50% PEG 400 BAE. This blend is treated as taught in Example 50 and tested by Methods 1, 2 and 3; results are shown in Table 8.

TABLE 7

| | PROPERTIES OF SOFT HYDROGEL CONTACT LENSES | | | | | | | |
|---|---|---|---|---|---|---|---|---|
| Example # | % MPEG 2000 | % MPEG 5000 | % DCPEG 4500 | % EWC | Modulus psi | Elongation % | Tensile psi | Dk |
| Example 50 | 2.5 | | 17 | 53 | 108 | 79 | 104 | 22 |
| Example 51 | 6 | | 17 | 55 | 104 | 126 | 196 | 25 |
| Example 52 | 14 | | 17 | 60 | 101 | 108 | 146 | 30 |
| Example 53 | 28 | | 17 | 66 | 99 | 89 | 125 | 37 |
| Example 54 | 2.5 | | 35 | 63 | 109 | 129 | 216 | 31 |
| Example 55 | 6 | | 35 | 64 | 96 | 99 | 155 | 34 |
| Example 56 | 14 | | 35 | 67 | 83 | 89 | 119 | 37 |
| Example 57 | 26.6 | | 33.2 | 74 | 104 | 82 | 128 | 44 |
| Example 58 | | 2.5 | 17 | 52 | 114 | 102 | 140 | 23 |
| Example 59 | | 6 | 17 | 54 | 107 | 118 | 157 | 23 |
| Example 60 | | 14 | 17 | 58 | 99 | 97 | 126 | 28 |
| Example 61 | | 28 | 17 | 66 | 83 | 126 | 135 | 37 |
| Example 62 | | 2.5 | 35 | 62 | 98 | 90 | 136 | 34 |
| Example 63 | | 6 | 35 | 63 | 96 | 112 | 161 | 35 |
| Example 64 | | 14 | 35 | 66 | 84 | 109 | 147 | 38 |
| Example 65 | | 26.6 | 33.2 | 75 | 61 | 105 | 104 | 49 |

As can be seen from Table 7, as the mPEG 2000 or mPEG 5000 is increased, the water content and Dk increase with a decrease in modulus. Also, when comparing EWC in Table 7 it can be seen that an increase in the diunsaturated PEG 4500 results in an increase in water content and Dk. It should be noted that in examples 57 and 65 the DMA, BPA 890, fluoromonomer, and diunsaturated PEG 4500 are reduced to account for the upper range of mPEG in these formulations.

EXAMPLE 66

Contact lenses are made from a blend of 13.83% HEMA, 10.0% DMA, 4.5% fluoromonomer (Example 31), 10.0% diunsaturated PEG 4000 (Example 1), 7.0% of the monounsaturated PEG 3350 of Example 11, 4.5% of the diunsaturated BPA of Example 20, 0.17% Darocur 1173, and 50% PEG 400 BAE. This blend is treated as taught in Example 50 and tested by Methods 1, 2 and 3; results are shown in Table 8.

EXAMPLE 67

Contact lenses are made from a blend of 4.83% HEMA, 10.0% DMA, 2.5% fluoromonomer (Example 31), 25.0% diunsaturated PEG 4500 (Example 49), 7.5% diunsaturated results are shown in Table 8.

EXAMPLE 70

Contact lenses are made from a blend of 1.33% HEMA, 15.0% DMA, 4.0% diunsaturated PEG 4500 (Example 49), 3.5% fluoromonomer (Example 31), 6.0% diunsaturated BPA (Example 20), 0.17% Darocur 1173, and 50% PEG 400 BAE. The blend is treated as taught in Ex. 50 and tested by Methods 1, 2 and 3; results are shown in Table 8.

TABLE 8

| PROPERTIES OF SOFT HYDROGEL CONTACT LENSES | | | | | |
|---|---|---|---|---|---|
| Example # | % EWC | Modulus psi | Elongation % | Tensile psi | Dk |
| Example 66 | 66 | 69 | 145 | 80 | 35 |
| Example 67 | 70 | 134 | 189 | 252 | 50 |
| Example 68 | 78 | 117 | 144 | 116 | 64 |
| Example 69 | 77 | 97 | 140 | 124 | 62 |
| Example 70 | 70 | 103 | 154 | 231 | 65 |

As can be seen from Table 8, various combinations of the monomers and crosslinkers disclosed within will give contact lens materials with superior oxygen permeability and mechanical properties.

EXAMPLES 71–107

In these examples, various diluents and diluent mixtures were used in conjunction with a reactive monomer mixture of HEMA, DMA PEG 4000XL (Example 1), diunsaturated bisphenol A crosslinker (Example 20), PEG 3350MC (Example 11), and Darocur 1173. The following is an illustrative preparation:

A reactive monomer blend was prepared of 64.7% by weight HEMA, 20.0% DMA, 7.0& of the diunsaturated PEG 4000 cross-linker of Example 1, 2.0% of the ethoxylated bisphenol A cross-linker of Example 20, 6.0% of the monounsaturated PEG 3350 of Example 11, and 0.34% Darocur 1173. To 60% by weight of this monomer blend was added 40% of PEG 1000 as an inert, displaceable diluent. After thoroughly mixing the above blend at 60° C., the mixture is allowed to stir under reduced pressure (40 mm Hg) for 30 min (at 60° C.) and subsequently transferred to contact lens molds. The filled molds are exposed to UV light (wavelength=300–380 nm, dose=1.2–1.6 Joules/cm$^2$) for 20 minutes at about 60° C. The molds are then separated, and placed in physiological saline for 3 hrs at 70° C. to remove the inert diluent and any residual unreacted monomers. After this initial hydration period the lenses are allowed to equilibrate to room temperature in a fresh bath of physiological saline. The lenses are then tested by Methods 1, 2 and 3.

The following tables display the proportions of the monomers and the results of the tests made in accordance with Test Methods 1, 2 and 3 for Examples 71–107:

|  | Example 71 | Example 72 | Example 73 (Modulus borderline) |
|---|---|---|---|
| Monomer (%): | | | |
| HEMA | 64.7 | 64.7 | 64.7 |
| DMA | 20 | 20 | 20 |
| PEG 4000XL | 7 | 7 | 7 |
| PEG 3350MC | 6 | 6 | 6 |
| BPA890XL | 2 | 2 | 2 |
| Darocur 1173 | 0.34 | 0.34 | 0.34 |
| Diluent: | PEG 1000 | PEG 750 | PEG 600 |
| Mon./Dil. Ratio | 60:40 | 60:40 | 60:40 |
| Properties: | | | |
| Modulus (psi) | 25 | 22 | 19 |
| % Elongation | 191 | 200 | 191 |
| Tens. Str. (psi) | 27 | 21 | 24 |
| Water Content (%) | 63.0 | 61.7 | 61.3 |
| Hydrogel | Clear | Clear | Clear |
| Kinetic Parameters: | | | |
| Tmax (min) | 3.50 | 3.90 | 4.00 |
| Conv. at Tmax (%) | 59.0 | 58.0 | 61.0 |

|  | Example 74 (Modulus borderline) | Example 75 |
|---|---|---|
| Monomer (%): | | |
| HEMA | 64.7 | 64.7 |
| DMA | 20 | 20 |
| PEG 4000XL | 7 | 7 |
| PEG 3350MC | 6 | 6 |
| BPA890XL | 2 | 2 |
| Darocur 1173 | 0.34 | 0.34 |
| Diluent: | PEG 400 | PEG 400BAE |
| Mon./Dil. Ratio | 60:40 | 60:40 |
| Properties: | | |
| Modulus (psi) | 18 | 51 |
| % Elongation | 189 | 122 |
| Tens. Strength (psi) | 26 | 46 |
| Water Content (%) | 62.1 | 61.3 |
| Hydrogel | Clear | Clear |
| Kinetic Parameters: | | |
| Tmax (min) | 4.30 | 0.34 |
| Conv. at Tmax (%) | 63.0 | 39.0 |

|  | Example 76 | Example 77 | Example 78 |
|---|---|---|---|
| Monomer (%): | | | |
| HEMA | 64.7 | 64.7 | 64.7 |
| DMA | 20 | 20 | 20 |
| PEG 4000XL | 7 | 7 | 7 |
| PEG 3350MC | 6 | 6 | 6 |
| BPA890XL | 2 | 2 | 2 |
| Darocur 1173 | 0.34 | 0.34 | 0.34 |
| Diluent: | GLUCAM E10 | GLUCAM E20 | Phot 7025 |
| Mon./Dil. Ratio | 60:40 | 60:40 | 60:40 |
| Properties: | | | |
| Modulus (psi) | 53 | 51 | 50 |
| % Elongation | 135 | 133 | 165 |
| Tens. Strength (psi) | 47 | 44 | 49 |
| Water Content (%) | 60.8 | 60.5 | 61.1 |
| Hydrogel | Clear | Clear | Clear |
| Kinetic Parameters: | | | |
| Tmax (min) | 1.10 | 0.90 | 1.10 |
| Conv. at Tmax (%) | 42.0 | 44.0 | 39.0 |

|  | Example 79 | Example 80 | Example 81 | Example 82 |
|---|---|---|---|---|
| Monomer (%): | | | | |
| HEMA | 64.7 | 64.7 | 64.7 | 64.7 |
| DMA | 20 | 20 | 20 | 20 |
| PEG 4000XL | 7 | 7 | 7 | 7 |
| BPA890 | 2 | 2 | 2 | 2 |
| PEG 3350MC | 6 | 6 | 6 | 6 |
| Darocur 1173 | 0.34 | 0.34 | 0.34 | 0.34 |
| Diluent (%): | | | | |
| PEG 400 | 90 | 7 | 60 | 50 |
| Photonol 7025 | 10 | 25 | 40 | 50 |
| Mon./Dil. Ratio | 60:40 | 60:40 | 60:40 | 60:40 |
| Properties: | | | | |
| Modulus (psi) | 27 | 31 | 30 | 39 |
| % Elongation | 200 | 210 | 190 | 186 |
| Tens. Strength (psi) | 28 | 31 | 29 | 35 |
| Water Content (%) | 62.1 | 61.9 | 62.0 | 61.2 |
| Hydrogel | Clear | Clear | Clear | Clear |
| Kinetic Parameters: | | | | |
| Tmax (min) | 4.2 | 4.0 | 3.9 | 3.4 |
| Conv. @ Tmax (%) | 59.0 | 56.0 | 52 | 53 |

|  | Example 83 | Example 84 | Example 85 |
|---|---|---|---|
| Monomer (%): | | | |
| HEMA | 64.7 | 64.7 | 64.7 |
| DMA | 20 | 20 | 20 |
| PEG 4000XL | 7 | 7 | 7 |
| BPA890 | 2 | 2 | 2 |
| PEG 3350MC | 6 | 6 | 6 |
| Darocur 1173 | 0.34 | 0.34 | 0.34 |
| Diluent (%): | | | |
| PEG 400 | 35 | 25 | 15 |

| | | | |
|---|---|---|---|
| Photonol 7025 | 65 | 75 | 85 |
| Mon./Dil. Ratio | 60:40 | 60:40 | 60:40 |
| Properties: | | | |
| Modulus (psi) | 42 | 51 | 52 |
| % Elongation | 175 | 185 | 160 |
| Tens. Strength (psi) | 40 | 40 | 43 |
| Water Content (%) | 61.1 | 60.9 | 60.7 |
| Hydrogel | Clear | Clear | Clear |
| Kinetic Parameters: | | | |
| Tmax (min) | 2.1 | 1.6 | 1.2 |
| Conv. @ Tmax (%) | 51.0 | 48.0 | 41.0 |

| | Example 86 | Example 87 | Example 88 | Example 89 |
|---|---|---|---|---|
| Monomer (%): | | | | |
| HEMA | 64.7 | 64.7 | 64.7 | 64.7 |
| DMA | 20 | 20 | 20 | 20 |
| PEG 4000XL | 7 | 7 | 7 | 7 |
| BPA890 | 2 | 2 | 2 | 2 |
| PEG 3350MC | 6 | 6 | 6 | 6 |
| Darocur 1173 | 0.34 | 0.34 | 0.34 | 0.34 |
| Diluent (%): | | | | |
| PEG 400 | 90 | 7 | 60 | 50 |
| GLUCAM E20 | 10 | 25 | 40 | 50 |
| Mon./Dil. Ratio | 60:40 | 60:40 | 60:40 | 60:40 |
| Properties: | | | | |
| Modulus (psi) | 24 | 29 | 30 | 37 |
| % Elongation | 185 | 190 | 188 | 178 |
| Tens. Strength (psi) | 25 | 29 | 31 | 34 |
| Water Content (%) | 61.8 | 61.7 | 61.2 | 61.0 |
| Hydrogel | Clear | Clear | Clear | Clear |
| Kinetic Parameters: | | | | |
| Tmax (min) | 4.1 | 3.7 | 3.2 | 2.1 |
| Conv. @ Tmax (%) | 59.0 | 50.0 | 49.0 | 46.0 |

| | Example 90 | Example 91 | Example 92 |
|---|---|---|---|
| Monomer (%): | | | |
| HEMA | 64.7 | 64.7 | 64.7 |
| DMA | 20 | 20 | 20 |
| PEG 4000XL | 7 | 7 | 7 |
| BPA890 | 2 | 2 | 2 |
| PEG 3350MC | 6 | 6 | 6 |
| Darocur 1173 | 0.34 | 0.34 | 0.34 |
| Diluent (%): | | | |
| PEG 400 | 90 | 75 | 60 |
| GLUCAM E20 | 10 | 25 | 40 |
| Mon./Dil. Ratio | 60:40 | 60:40 | 60:40 |
| Properties: | | | |
| Modulus (psi) | 44 | 48 | 52 |
| % Elongation | 150 | 150 | 141 |
| Tens. Strength (psi) | 41 | 39 | 45 |
| Water Content (%) | 60.8 | 60.7 | 60.5 |
| Hydrogel | Clear | Clear | Clear |
| Kinetic Parameters: | | | |
| Tmax (min) | 1.4 | 1.0 | 0.9 |
| Conv. @ Tmax (%) | 48.0 | 44.0 | 47.0 |

| | Example 93 | Example 94 (Modulus borderline) | Example 95 | Example 96 |
|---|---|---|---|---|
| Monomer (%): | | | | |
| HEMA | 64.7 | 64.7 | 64.7 | 64.7 |
| DMA | 20 | 20 | 20 | 20 |
| PEG 4000XL | 7 | 7 | 7 | 7 |
| BPA890 | 2 | 2 | 2 | 2 |
| PEG 3350MC | 6 | 6 | 6 | 6 |
| Darocur 1173 | 0.34 | 0.34 | 0.34 | 0.34 |
| Diluent (%): | | | | |
| PEG 1000 | 100 | 90 | 75 | 60 |
| GLUCAM E20 | 0 | 10 | 25 | 40 |
| Mon./Dil. Ratio | 60:40 | 60:40 | 60:40 | 60:40 |
| Properties: | | | | |
| Modulus (psi) | 25 | 21 | 28 | 33 |
| % Elongation | 191 | 190 | 175 | 184 |
| Tens. Str. (psi) | 27 | 30 | 37 | 31 |
| Water Content (%) | 63.0 | 62.3 | 62.0 | 61.6 |
| Hydrogel | Clear | Clear | Clear | Clear |
| Kinetic Parameters: | | | | |
| Tmax (min) | 3.5 | 3.3 | 2.9 | 2.6 |
| Conv. @ Tmax (%) | 59.0 | 55.0 | 53.0 | 54.0 |

| | Example 97 | Example 98 | Example 99 | Examp. 100 |
|---|---|---|---|---|
| Monomer (%): | | | | |
| HEMA | 64.7 | 64.7 | 64.7 | 64.7 |
| DMA | 20 | 20 | 20 | 20 |
| PEG 4000XL | 7 | 7 | 7 | 7 |
| BPA890 | 2 | 2 | 2 | 2 |
| PEG 3350MC | 6 | 6 | 6 | 6 |
| Darocur 1173 | 0.34 | 0.34 | 0.34 | 0.34 |
| Diluent (%): | | | | |
| PEG 1000 | 50 | 35 | 25 | 15 |
| GLUCAM E20 | 50 | 65 | 75 | 85 |
| Mon./Dil. Ratio | 60:40 | 60:40 | 60:40 | 60:40 |
| Properties: | | | | |
| Modulus (psi) | 34 | 33 | 47 | 49 |
| % Elongation | 141 | 132 | 122 | 111 |
| Tens. Strength (psi) | 42 | 41 | 49 | 41 |
| Water Content (%) | 61.0 | 61.3 | 60.8 | 61.0 |
| Hydrogel | Clear | Clear | Clear | Clear |
| Kinetic Parameters: | | | | |
| Tmax (min) | 2.1 | 1.4 | 1.1 | 1.1 |
| Conv. @ Tmax (%) | 49.0 | 47.0 | 46.0 | 41.0 |

| | Examp. 101 (Modulus borderline) | Examp. 102 | Examp. 103 | Examp. 104 |
|---|---|---|---|---|
| Monomer (%): | | | | |
| HEMA | 64.7 | 64.7 | 64.7 | 64.7 |
| DMA | 20 | 20 | 20 | 20 |
| PEG 4000XL | 7 | 7 | 7 | 7 |
| BPA890 | 2 | 2 | 2 | 2 |
| PEG 3350MC | 6 | 6 | 6 | 6 |
| Darocur 1173 | 0.34 | 0.34 | 0.34 | 0.34 |
| Diluent (%): | | | | |
| PEG 1000 | 90 | 75 | 60 | 50 |
| Photonol 7025 | 10 | 25 | 40 | 50 |
| Mon./Dil. Ratio | 60:40 | 60:40 | 60:40 | 60:40 |
| Properties: | | | | |
| Modulus (psi) | 19 | 27 | 32 | 35 |
| % Elongation | 183 | 175 | 181 | 177 |
| Tens. Str. (psi) | 36 | 28 | 31 | 33 |

|  | | | | |
|---|---|---|---|---|
| Water Content (%) | 61.1 | 62.8 | 62.5 | 62.1 |
| Hydrogel | Clear | Clear | Clear | Clear |
| Kinetic Parameters: | | | | |
| Tmax (min) | 3.6 | 3.4 | 3.1 | 2.7 |
| Conv. @ Tmax (%) | 49.0 | 51.0 | 45.0 | 39.0 |

|  | Examp. 105 | Examp. 106 | Examp. 107 |
|---|---|---|---|
| Monomer (%): | | | |
| HEMA | 64.7 | 64.7 | 64.7 |
| DMA | 20 | 20 | 20 |
| PEG 4000XL | 7 | 7 | 7 |
| BPA890 | 2 | 2 | 2 |
| PEG 3350MC | 6 | 6 | 6 |
| Darocur 1173 | 0.34 | 0.34 | 0.34 |
| Diluent (%): | | | |
| PEG 1000 | 90 | 75 | 60 |
| Photonol 7025 | 10 | 25 | 40 |
| Mon./Dil. Ratio | 60:40 | 60:40 | 60:40 |
| Properties: | | | |
| Modulus (psi) | 39 | 45 | 46 |
| % Elongation | 131 | 125 | 130 |
| Tens. Strength (psi) | 41 | 41 | 47 |
| Water Content (%) | 61.5 | 60.7 | 60.8 |
| Hydrogel | Clear | Clear | Clear |
| Kinetic Parameters: | | | |
| Tmax (min) | 1.4 | 1.1 | 1.1 |
| Conv. @ Tmax (%) | 41.0 | 42.0 | 44.0 |

EXAMPLES 108–119

A reactive monomer blend was prepared using various amounts of HERA, 20.0% DMA, 16.0% of the diunsaturated PEG 4500 crosslinker described in Example 49 (PEG 4500XL), 8.0% or 15.0% of the ethoxylated bisphenol A crosslinker described in Example 20 (BPA890), various amounts of the monounsaturated monomethoxy PEG 2000 described in Example 47 (MC mPEG 2000), and 0.4% of Darocur 1173. To 55% by weight of this monomer blend was added 45% or 55% of an inert, displaceable diluent made up of 50% GLUCAM E-20 and 50% Photonol 7025. After thoroughly mixing the above blend at 60° C., the mixture is allowed to stir under reduced pressure (40 mm Hg) for 30 min (at 60° C.) and subsequently transferred to contact lens molds. The filled molds are exposed to UV light (wavelength =300–380 nm, dose=1.2–1.6 Joules/cm$^2$) for 20 minutes at approximately 60° C.. The molds are then separated, and placed in physiological saline for 3.0 hrs at 70° C. to remove the inert diluent and any residual, unreacted monomers. After this initial hydration period the lenses are allowed to equilibrate to room temperature in a fresh bath of physiological saline. The lenses are then tested by test methods 1, 2 and 3.

The reactive monomer mixture formulations and the results of the tests of the lenses prepared in accordance with Examples 108–119 are shown in the following tables:

|  | Examp. 108 | Examp. 109 | Examp. 110 |
|---|---|---|---|
| Monomer (%): | | | |
| HEMA | 43.6 | 34.6 | 20.6 |
| DMA | 20 | 20 | 20 |
| PEG 4500XL | 16 | 16 | 16 |
| BPA890 | 8 | 8 | 8 |
| MC mPEG 2000 | 12 | 21 | 35 |
| Darocur 1173 | 0.4 | 0.4 | 0.4 |
| Diluent (%): | | | |
| Photonol 7025 | 50 | 50 | 50 |
| GLUCAM E-20 | 50 | 50 | 50 |
| Mon./Dil. Ratio | 55:45 | 55:45 | 55:45 |
| Properties: | | | |
| Modulus (psi) | 76 | 77 | 75 |
| % Elongation | 148 | 113 | 117 |
| Dk | 37 | 42 | 50 |
| Water Content (%) | 70.5 | 73.8 | 78.1 |
| Hydrogel | Clear | Clear | Clear |

|  | Examp. 111 | Examp. 112 | Examp. 113 |
|---|---|---|---|
| Monomer (%): | | | |
| HEMA | 43.6 | 34.6 | 20.6 |
| DMA | 20 | 20 | 20 |
| PEG 4500XL | 16 | 16 | 16 |
| BPA890 | 8 | 8 | 8 |
| MC mPEG 2000 | 12 | 21 | 35 |
| Darocur 1173 | 0.4 | 0.4 | 0.4 |
| Diluent (%): | | | |
| Photonol 7025 | 50 | 50 | 50 |
| GLUCAM E-20 | 50 | 50 | 50 |
| Mon./Dil. Ratio | 45:55 | 45:55 | 45:55 |
| Properties: | | | |
| Modulus (psi) | 51 | 44 | 47 |
| % Elongation | 142 | 119 | 128 |
| Dk | 40 | 47 | 55 |
| Water Content (%) | 72.9 | 76.6 | 80.3 |
| Hydrogel | Clear | Clear | Clear |

|  | Examp. 114 | Examp. 115 | Examp. 116 |
|---|---|---|---|
| Monomer (%): | | | |
| HEMA | 36.6 | 27.6 | 13.6 |
| DMA | 20 | 20 | 20 |
| PEG 4500XL | 16 | 16 | 16 |
| BPA890 | 15 | 15 | 15 |
| MC mPEG 2000 | 12 | 21 | 35 |
| Darocur 1173 | 0.4 | 0.4 | 0.4 |
| Diluent (%): | | | |
| Photonol 7025 | 50 | 50 | 50 |
| GLUCAM E-20 | 50 | 50 | 50 |
| Mon./Dil. Ratio | 55:45 | 55:45 | 55:45 |
| Properties: | | | |
| Modulus (psi) | 130 | 126 | 125 |
| % Elongation | 96 | 81 | 68 |
| Dk | 29 | 33 | 50 |
| Water Content (%) | 64.7 | 68.2 | 78.1 |
| Hydrogel | Clear | Clear | Clear |

|  | Examp. 117 | Examp. 118 | Examp. 119 |
|---|---|---|---|
| Monomer (%): | | | |
| HEMA | 36.6 | 27.6 | 13.6 |
| DMA | 20 | 20 | 20 |
| PEG 4500XL | 16 | 16 | 16 |
| BPA890 | 15 | 15 | 15 |
| MC mPEG 2000 | 12 | 21 | 35 |
| Darocur 1173 | 0.4 | 0.4 | 0.4 |
| Diluent (%): | | | |
| Photonol 7025 | 50 | 50 | 50 |
| GLUCAM E-20 | 50 | 50 | 50 |
| Mon./Dil. Ratio | 45:55 | 45:55 | 45:55 |

-continued

| Properties: | | | |
|---|---|---|---|
| Modulus (psi) | 87 | 90 | 85 |
| % Elongation | 122 | 90 | 78 |
| Dk | 40 | 47 | 55 |
| Water Content (%) | 72.9 | 76.6 | 80.3 |
| Hydrogel | Clear | Clear | Clear |

EXAMPLE 120 Synthesis of monounsaturated monomethoxy polyethylene glycol (mPEG) 350 or MC mPEG 350

To a 1 L three neck flask are added 100 g (0.2912 moles) of dry mPEG 350 (molecular weight=343.4 g/mol), 300 g of dry isopropyl acetate, 0.1497 g (1000 ppm) of di t-butyl-4-hydroxy anisole (DTBHA) and 0.10 g of stannous octoate. After these components are added, the resulting solution is purged with dry $O_2$ for 20 minutes (a gas diffuser is used for this purpose). After the $O_2$ purge is completed, 47.70 g (1.1 mol) of isocyanatoethyl methacrylate (IEM) and 100 g of isopropyl acetate are charged to a 250mL addition funnel (this operation is preferably carried out under $N_2$).

The contents of the addition funnel (i.e. the IEM solution) are then added, dropwise with vigorous stirring, to the 1 L round bottom flask. The addition should take approximately 4 hours to complete. After the IEM addition is complete, the addition funnel is rinsed with approximately 50mL of isopropyl acetate. The progress of the reaction is monitored by following the disappearance of the NCO absorption at 2270 $cm^{-1}$ in the infrared spectra. The isopropyl acetate is removed under reduced pressure and the resultant liquid monounsaturated mPEG 350 is used as prepared.

EXAMPLE 121–126

A reactive monomer blend was prepared using various amounts of HEMA, 25.0% diunsaturated PEG 4500 crosslinker (PEG 4500 XL) described in Example 49, various amounts of polyethylene glycol 1000 dimethacrylate (PEG 1000 XL) and 0.4% of Darocur 1173. To 60% by weight of this monomer blend was added 40% of an inert, displaceable diluent made up of 50% GLUCAM E-20 and 50% Photonol 7025. After thoroughly mixing the above blend at 60° C., the mixture is allowed to stir under reduced pressure (40mm HG) for 30 min. (at 60° C. and subsequently transferred to contact lens molds. The filled molds are exposed to UVlight (wavelength=300–380 nm, dose =1.2–1.6 Joules/cm² for 20 minutes at approximately 60° C. The molds are then separated and placed in deionized water for 3–4 hours at 70° C. to remove the inert diluent and any residual, unreacted monomers. After this initial hydration period, the lenses are allowed to equilibrate to room temperature in a fresh bath of physiological saline. The lenses are then tested according to Test Methods 2 and 3. The values given for Dk are pulled from a theoretical curve of water content vs oxygen permeability (Dk= $(1.33)(1.53)e^{(0.041)(H20)}$).

The reactive monomer mixture formulations and the results of the tests of the lenses prepared in accordance with Examples 121–126 are shown in the following tables:

| | Example 121 | Example 122 | Example 123 |
|---|---|---|---|
| Monomer (%): | | | |
| HEMA | 72.6 | 69.6 | 67.6 |
| PEG 4500 XL | 25.0 | 25.0 | 25.0 |
| PEG 1000 XL | 2.0 | 5.0 | 7.0 |
| Darocur 1173 | 0.4 | 0.4 | 0.4 |
| Diluent (%): | | | |
| GLUCAM E-20 | 50 | 50 | 50 |
| Photonol 7025 | 50 | 50 | 50 |
| Mon./Dil. Ratio | 60:40 | 60:40 | 60:40 |
| Properties: | | | |
| Modulus (psi) | 91 | 105 | 148 |
| Elongation (%) | 208 | 170 | 141 |
| Water Content (%) | 59.4 | 59.4 | 59.0 |
| Dk | 23 | 23 | 23 |
| Hydrogel | Clear | Clear | Clear |

| | Example 124 | Example 125 | Example 126 |
|---|---|---|---|
| Monomer (%): | | | |
| HEMA | 62.6 | 53.6 | 44.6 |
| PEG 4500 XL | 25.0 | 25.0 | 25.0 |
| PEG 1000 XL | 12.0 | 21.0 | 30.0 |
| Darocur 1173 | 0.4 | 0.4 | 0.4 |
| Diluent (%): | | | |
| GLUCAM E-20 | 50 | 50 | 50 |
| Photonol 7025 | 50 | 50 | 50 |
| Mon./Dil. Ratio | 60:40 | 60:40 | 60:40 |
| Properties: | | | |
| Modulus (psi) | 210 | 290 | 298 |
| Elongation (%) | 103 | 62 | 84 |
| Water Content (%) | 60.0 | 61.3 | 60.1 |
| Dk | 24 | 25 | 24 |
| Hydrogel | Clear | Clear | Clear |

EXAMPLES 127–131

A reactive monomer blend was prepared using various amounts of HEMA, 15.0% diunsaturated PEG 4500 crosslinker (PEG 4500 XL) described in Example 49, 10% polyethylene glycol 1000 dimethacrylate (PEG 1000 XL), various amounts of monounsaturated monomethoxy PEG 350 (MC mPEG 350) described in Example 120 and 0.4% of Darocur 1173. To 60% by weight of this monomer blend was added 40% of an inert, displaceable diluent made up of 50% GLUCAM E-20 and 50% Photonol 7025. After thoroughly mixing the above blend at 60° C., the mixture is allowed to stir under reduced pressure (40mm HG) for 30 min. (at 60° C. and subsequently transferred to contact lens molds. The filled molds are exposed to UV light (wavelength =300–380 nm, dose=1.2–1.6 Joules/cm² for 20 minutes at approximately 60° C.. The molds are then separated and placed in deionized water for 3–4 hours at 70° C. to remove the inert diluent and any residual, unreacted monomers. After this initial hydration period, the lenses are allowed to equilibrate to room temperature in a fresh bath of physiological saline. The lenses are then tested according to Test Methods 2 and 3. The values given for Dk are pulled from a theoretical curve of water content vs oxygen permeability (Dk=$(1.33)(1.53)e^{(0.041)(H20)}$)

The reactive monomer mixture formulations and the results of the tests of the lenses prepared in accordance with Examples 127–131 are shown in the following tables:

|  | Example 127 | Example 128 | Example 129 |
|---|---|---|---|
| Monomer (%): | | | |
| HEMA | 69.6 | 62.6 | 54.6 |
| PEG 4500 XL | 15.0 | 15.0 | 15.0 |
| PEG 1000 XL | 10.0 | 10.0 | 10.0 |
| MC mPEG 350 | 5.0 | 12.0 | 20.0 |
| Darocur 1173 | 0.4 | 0.4 | 0.4 |
| Diluent (%): | | | |
| GLUCAM E-20 | 50 | 50 | 50 |
| Photonol 7025 | 50 | 50 | 50 |
| Mon./Dil. Ratio | 60:40 | 60:40 | 60:40 |
| Properties: | | | |
| Modulus (psi) | 100 | 100 | 112 |
| Elongation (%) | 109 | 123 | 99 |
| Water Content (%) | 56.5 | 59.2 | 62.7 |
| Dk | 21 | 23 | 27 |
| Hydrogel | Clear | Clear | Clear |

|  | Example 130 | Example 131 |
|---|---|---|
| Monomer (%): | | |
| HEMA | 49.6 | 43.6 |
| PEG 4500 XL | 15.0 | 15.0 |
| PEG 1000 XL | 10.0 | 10.0 |
| MC mPEG 350 | 25.0 | 31.0 |
| Darocur 1173 | 0.4 | 0.4 |
| Diluent (%): | | |
| GLUCAM E-20 | 50 | 50 |
| Photonol 7025 | 50 | 50 |
| Mon./Dil. Ratio | 60:40 | 60:40 |
| Properties: | | |
| Modulus (psi) | 119 | 127 |
| Elongation (%) | 125 | 112 |
| Water Content (%) | 64.3 | 65.9 |
| Dk | 28 | 30 |
| Hydrogel | Clear | Clear |

EXAMPLES 132–136

A reactive monomer blend was prepared using various amounts of HEMA, 15.0% diunsaturated PEG 4500 crosslinker (PEG 4500 XL) described in Example 49, 10% diunsaturated bisphenol A crosslinker (BPA 890) described in Example 20, various amounts of monounsaturated monomethoxy PEG 350 (MC mPEG 350) described in Example 120 and 0.4% of Darocur 1173. To 60% by weight of this monomer blend was added 40% of an inert, displaceable diluent made up of 50% GLUCAME-20 and 50% Photonol 7025. After thoroughly mixing the above blend at 60° C., the mixture is allowed to stir under reduced pressure (40mm HG) for 30 min. (at 60° C. and subsequently transferred to contact lens molds. The filled molds are exposed to UV light (wavelength=300–380 nm, dose= 1.2–1.6 Joules/cm$^2$ for 20 minutes at approximately 60° C.. The molds are then separated and placed in deionized water for 3–4 hours at 70° C. to remove the inert diluent and any residual, unreacted monomers. After this initial hydration period, the lenses are allowed to equilibrate to room temperature in a fresh bath of physiological saline. The lenses are then tested according to Test Methods 2 and 3. The values given for Dk are pulled from a theoretical curve of water content vs oxygen permeability (Dk= (1.33)(1.53)e$^{(0.041)}$($H20$)).

The reactive monomer mixture formulations and the results of the tests of the lenses prepared in accordance with Examples 132–136 are shown in the following tables:

|  | Example 132 | Example 133 | Example 134 |
|---|---|---|---|
| Monomer (%): | | | |
| HEMA | 69.6 | 62.6 | 54.6 |
| PEG 4500 XL | 15.0 | 15.0 | 15.0 |
| BPA 890 | 10.0 | 10.0 | 10.0 |
| MC mPEG 350 | 5.0 | 12.0 | 20.0 |
| Darocur 1173 | 0.4 | 0.4 | 0.4 |
| Diluent (%): | | | |
| GLUCAM E-20 | 50 | 50 | 50 |
| Photonol 7025 | 50 | 50 | 50 |
| Mon./Dil. Ratio | 60:40 | 60:40 | 60:40 |
| Properties: | | | |
| Modulus (psi) | 158 | 152 | 146 |
| Elongation (%) | 137 | 138 | 108 |
| Water Content (%) | 47.0 | 50.1 | 53.6 |
| Dk | 14 | 16 | 18 |
| Hydrogel | Clear | Clear | Clear |

|  | Example 135 | Example 136 |
|---|---|---|
| Monomer (%): | | |
| HEMA | 49.6 | 43.6 |
| PEG 4500 XL | 15.0 | 15.0 |
| BPA 890 | 10.0 | 10.0 |
| MC mPEG 350 | 25.0 | 31.0 |
| Darocur 1173 | 0.4 | 0.4 |
| Diluent (%): | | |
| GLUCAM E-20 | 50 | 50 |
| Photonol 7025 | 50 | 50 |
| Mon./Dil. Ratio | 60:40 | 60:40 |
| Properties: | | |
| Modulus (psi) | 138 | 136 |
| Elongation (%) | 112 | 114 |
| Water Content (%) | 55.7 | 58.0 |
| Dk | 20 | 22 |
| Hydrogel | Clear | Clear |

What is claimed is:

1. A crosslinked polymer comprising the reaction product of a monomer mixture comprising:

(A) a monounsaturated polyoxyethylene monomer of the formula:

$$RO(CH_2CH_2O)_n-CO-(X)_m-R^1 \qquad (I)$$

wherein:

R represents an alkyl group having from 1 to 20 carbon atoms;

n represents a number having a value such that the monounsaturated polyoxyethylene monomer has a molecular weight of from about 500 to about 5500;

X represents imido (—NH—);

m is 1; and $R^1$ represents the residue after removal of the isocyanato group of an organic monoisocyanate that contains a polymerizable olefinic group;

(B) a diunsaturated polyoxyethylene monomer of the formula:

$$R^1-(X)_m-CO-O(CH_2CH_2O)_n-CO-(X)_m-R^1 \qquad (II)$$

wherein n is a number having a value so that the diunsaturated polyoxyethylene monomer has a molecular weight within the range of from about 2000 to about 11,000, and X, m and $R^1$ are as defined above in connection with the monounsaturated polyoxyethylene monomer;

(C) a diunsaturated polyoxyethylene monomer selected from the group consisting of:
(i) a momomer of Formula (II) wherein n is a number having a value so that the diunsaturated polyoxyethylene monomer has a molecular weight within the range of from about 300 to about 1700, and X, m and $R^1$ are as defined above in connection with the monounsaturated polyoxyethylene monomer;
(ii) a monomer of the formula:

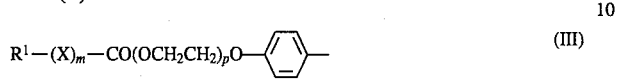

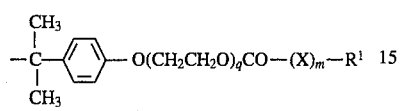

wherein $R^1$ m and X are as defined above, and p+q are selected so that the monomer represented by Formula (III) has a molecular weight within the range of from about 500 to 1900; and
(iii) mixtures of monomers of Formulas (II) and (III), having the molecular weights defined in this paragraph (C); and
(D) a hydrophilic monomer selected from the group consisting of hydroxyethyl methacrylate, methacrylic acid, N,N-dimethylacrylamide, N-vinyl pyrrolidone, glycerol monomethacrylate, itaconic acid, and mixtures thereof.

2. The polymer of claim 1 wherein $R^1$ is a member selected from the group consisting of monovalent groups of the formula:

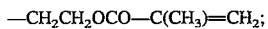

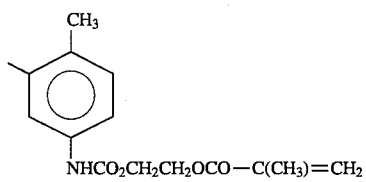

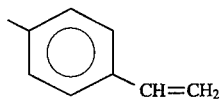

and

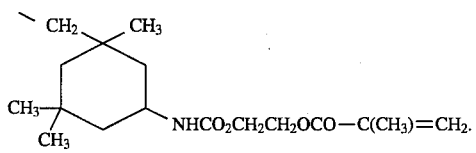

3. The polymer of claim 1 wherein R in Formula (I) represents $C_{1-6}$alkyl.

4. The polymer of claim 2 wherein R in Formula (I) represents $C_{1-6}$alkyl.

5. The polymer of claim 3 wherein $R^1$ in Formulas (I), (II) and (III) represents a group of the formula —$CH_2CH_2OCO$—$C(CH_3)$=$CH_2$.

6. The polymer of claim 4 wherein $R^1$ in Formulas (I), (II) and (III) represents a group of the formula —$CH_2CH_2OCO$—$C(CH_3)$=$CH_2$.

7. The polymer of claim 2 wherein the monomer mixture comprises:

(1) From about 2 to 40 weight percent of a diunsaturated polyoxyethylene monomer represented by Formula (II):

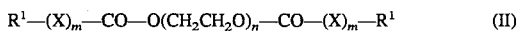

wherein
n is a number having a value so that the diunsaturated polyoxyethylene monomer has a molecular weight within the range of from about 2000 to about 11,000, m=1, and X and $R^1$ are as defined above;

(2) From about 2 to 40 weight percent of a monounsaturated polyoxyethylene monomer represented by Formula (I):

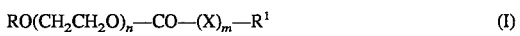

wherein R=$C_{1-4}$alkyl, m=1, n is selected so that the monomer represented by Formula (I) has a molecular weight of from about 500 to about 5500, and X and $R^1$ are as defined above;

(3) From about 0.5 to 20 weight percent of a diunsaturated polyoxyethylene monomer represented by either:
(i) Formula (III):

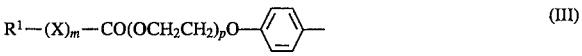

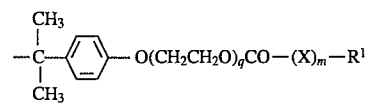

wherein $R^1$ and X are as defined above, m=1, and p+q are selected so that the monomer has a molecular weight within the range of from about 500 to 1900; or
(ii) Formula (IV):

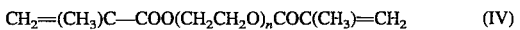

wherein n is selected so that the monomer represented by Formula (IV) has a molecular weight of from about 300 to about 1700; or
(iii) a mixture of (i) and (ii); and (4) from about 10 to 50 weight percent of a hydrophilic monomer selected from the group consisting of hydroxyethyl methacrylate, methacrylic acid, N,N-dimethylacrylamide, N-vinyl pyrrolidone, glycerol monomethacrylate, itaconic acid, and mixtures thereof.

8. The polymer of claim 7 wherein $R^1$ is a member selected from the group consisting of monovalent groups of the formula:

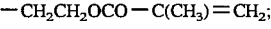

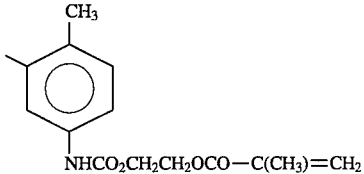

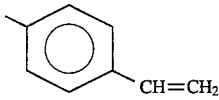

and

-continued

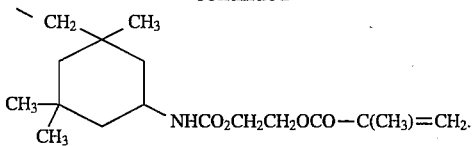
NHCO$_2$CH$_2$CH$_2$OCO—C(CH$_3$)=CH$_2$.

9. The polymer of claim 7 wherein R is C$_{1-6}$alkyl and R$^1$ is a group of the formula —CH$_2$CH$_2$OCO—C(CH$_3$)=CH$_2$.

10. The polymer of claim 8 wherein R is C$_{1-6}$alkyl and R$^1$ is a group of the formula —CH$_2$CH$_2$OCO—C(CH$_3$)=CH$_2$.

11. The polymer of claim 9 wherein R is methyl.
12. The polymer of claim 10 wherein R is methyl.
13. A soft contact lens comprising the polymer of claim 1.
14. A soft contact lens comprising the polymer of claim 2.
15. A soft contact lens comprising the polymer of claim 3.
16. A soft contact lens comprising the polymer of claim 4.
17. A soft contact lens comprising the polymer of claim 5.
18. A soft contact lens comprising the polymer of claim 6.
19. A soft contact lens comprising the polymer of claim 7.
20. A soft contact lens comprising the polymer of claim 8.
21. A soft contact lens comprising the polymer of claim 9.
22. A soft contact lens comprising the polymer of claim 10.
23. A soft contact lens comprising the polymer of claim 11.
24. A soft contact lens comprising the polymer of claim 12.

* * * * *